(12) United States Patent
Bühler et al.

(10) Patent No.: US 8,129,650 B2
(45) Date of Patent: Mar. 6, 2012

(54) METHOD AND DEVICE FOR STRETCHING AND/OR SEPARATING WIRES

(75) Inventors: Ernst Bühler, Losone (CH); Dante Scricciolo, Losone (CH)

(73) Assignee: Agie Charmilles SA, Losone (CH)

( * ) Notice: Subject to any disclaimer, the term of this patent is extended or adjusted under 35 U.S.C. 154(b) by 1065 days.

(21) Appl. No.: 12/012,969

(22) Filed: Feb. 6, 2008

(65) Prior Publication Data
US 2008/0190897 A1 Aug. 14, 2008

(30) Foreign Application Priority Data
Feb. 9, 2007 (DE) .......................... 10 2007 006 595

(51) Int. Cl.
*B23H 7/10* (2006.01)
(52) U.S. Cl. ...................... 219/69.12; 219/68; 219/69.13
(58) Field of Classification Search .................. 140/139; 219/68, 69.12, 69.17, 69.13
See application file for complete search history.

(56) References Cited

U.S. PATENT DOCUMENTS

| | | | | |
|---|---|---|---|---|
| 4,262,185 A | * | 4/1981 | Delpretti | 219/69.12 |
| 4,427,870 A | | 1/1984 | Inoue | |
| 4,474,825 A | * | 10/1984 | Schmidt | 219/69.12 |
| 4,547,647 A | | 10/1985 | Schneider | |
| 4,618,761 A | * | 10/1986 | Inoue et al. | 219/69.15 |
| 4,743,730 A | | 5/1988 | Martin et al. | |
| 4,929,810 A | | 5/1990 | Kawase | |
| 6,979,794 B1 | | 12/2005 | Nakashima et al. | |

FOREIGN PATENT DOCUMENTS

| | | |
|---|---|---|
| DE | 3919481 C2 | 1/1990 |
| EP | 263439 A2 * | 4/1988 |
| JP | 54-141490 A * | 11/1979 |
| JP | 5-220624 A * | 8/1993 |
| JP | 05220624 A | 8/1993 |
| JP | 5-285736 A * | 11/1993 |

OTHER PUBLICATIONS

Machine translation of Japan Patent document No. 5-285,736, Aug. 2011.*

* cited by examiner

*Primary Examiner* — Geoffrey S Evans
(74) *Attorney, Agent, or Firm* — Harness, Dickey & Pierce, P.L.C.

(57) ABSTRACT

The methods and devices enable a reliable and rapid automatic threading process on spark-erosive wire-cutting machines with closed round guides without complicated entry of parameters. A heat-output control device with an optimized output characteristic curve is supplied from a DC voltage source of the erosion generator. Through an at least partial feedback loop of heating current and source voltage, the characteristic curve is modified in such a way that different wire types or different annealing lengths for the wire provide optimal results for stretching, straightening and separating the wire electrode without controlled intervention. With adaptive control it is possible to thread future wire types automatically without reprogramming.

31 Claims, 6 Drawing Sheets

METHOD AND DEVICE FOR STRETCHING AND/OR SEPARATING WIRES

AREA OF THE INVENTION

The invention relates to a method and a device for stretching and/or separating wire-shaped processing electrodes for automatic threading devices in spark-erosive wire-cutting machines.

BACKGROUND OF THE INVENTION

In one method for spark-erosive wire cutting operations, known as wire-erosion, a contour is cut into, or from, a second electrode—the workpiece—beginning from a starting hole or a reference surface using a first electrode—the erosion wire or the wire electrode. The wire electrode is continuously drawn from a supply coil, taken over a wire guide located above the workpiece to the processing zone and taken away through the processing zone and over a wire guide located below the workpiece. Known methods for spark-erosive wire cutting operations need to be further rationalized and simplified. The machine operator can no longer be expected to separate and thread the wire electrode manually at the start of each new cutting contour or following an unintentional wire break. An undetected wire break can also result in intolerably long machine downtimes and consequently to material losses.

Manually threading the wire electrode into closed wire guides, known as circular guides, with little play in the guide, places great demands on the operator and should therefore be automated.

PRIOR ART

In practice, operators of manual wire cutting machines mostly use a lighter to heat the wire electrode and pull it by hand until it breaks. As a result, a tapered, straight tip is created which can be threaded into a round guide with great dexterity. Round guides are preferred because of their ease of manufacture and have good guide qualities, particularly with conical cutting operations. Open V-shaped wire guides on the other hand have great advantages when the wire diameter changes frequently and the threading procedure is less demanding. It can also be advantageous for this type of guides to stretch, straighten and separate the wire by heating because mechanical blades can cut ever so perfectly but even in the best case they leave behind a sharp-edged wire end.

Many solutions are known for automating the process of threading into closed round guides. Generally, all these solutions are too complex in their construction and in their methods, therefore uneconomical, and also too slow. Usually comprehensive parameter tables must be available in the controls for each wire size, wire material and wire length, or alternatively mathematical calculations must be performed using tedious and complicated parameter inputs.

In U.S. Pat. No. 4,547,647 it is proposed to anneal and pull the wire in a heating tunnel and subsequently to drive it with a high-pressure water jet through the starting hole for the workpiece and the guides. It is proposed to heat the wire electrically but there is no detailed discussion of the required device.

In U.S. Pat. No. 4,743,730 it is stated how the wire electrode can be stretched using electrical current and how by using a heat shield the separation location can be defined, forming a needle-point end. AC voltage or DC voltage in the range of 10 to 12 volts is suggested as a source but not described further.

A further solution is presented in U.S. Pat. No. 4,929,810 in which a DC voltage source, or a high-frequency source, is provided in conjunction with different resistances. The high-frequency source is supposed to cause the so-called "skin effect" in the wire electrode, which is intended to give the cut a round shape. The use of resistances to adjust the heating current is disadvantageous for efficiency and can result in undesirable heating of the machine structure. The favorable effect of a high frequency on the tip shape is probably more theoretical in nature. Since the wire electrode typically has a diameter of 0.25 mm, and with realistic frequencies of less than 1 MHz, the penetration depth of the current practically fills the wire cross-section, so no special effect can be anticipated.

In the Japanese disclosure JP 5 220 624 A, a heat output control device is proposed which consists of a DC source, a load resistance, a switching element and a control circuit. The control circuit is supposed to activate the switching element using pulse width modulation in such a way that over time a heating current increasing in linear fashion is created until the wire is cut through. Using this method, all wire diameters are supposed to be able to be separated automatically. The disadvantage of this method is the fact that there is clearly no "ideal ramp" for all wires since the resistance range extends in its entirety across more than 1.5 decades. Using a "standardized" ramp, thin wires would tend to tear at an unspecified location without forming the needle-shaped tip. For thicker wires the process would always take a long time and the wire would be neither stretched nor straightened (see example FIG. 9). A poor rate of success for threading can be expected with such a solution.

SUMMARY OF THE INVENTION

One objective of the invention is to improve the method and devices of the aforementioned type with respect to their efficiency.

In accordance with one aspect, the invention presents a method for stretching and/or separating a wire electrode of a wire-cutting machine in accordance with the subject of independent claim 1. In accordance with this process, an electrical load current from a DC source or a heating current created by said load current is applied to the wire electrode to heat the wire electrode. Further, the (natural) power characteristic curve $P=U^2/R$ for the DC source is modified as a function of the load resistance of the wire electrode by a feedback loop of load current and source current such that the heat output acting on the wire electrode is adjusted to the specified operating conditions for the stretching and/or separating procedure.

A further aspect of the invention relates to a spark-erosive wire-cutting machine having such a device for stretching and/or separating wire electrodes.

Different embodiments of the invention become apparent from the dependent claims, the following description and the drawing.

BRIEF DESCRIPTION OF THE DRAWING

Preferred embodiments of the invention are explained in more detail in what follows with reference to the attached drawings.

DESCRIPTION OF PREFERRED EMBODIMENTS

Figure 1:
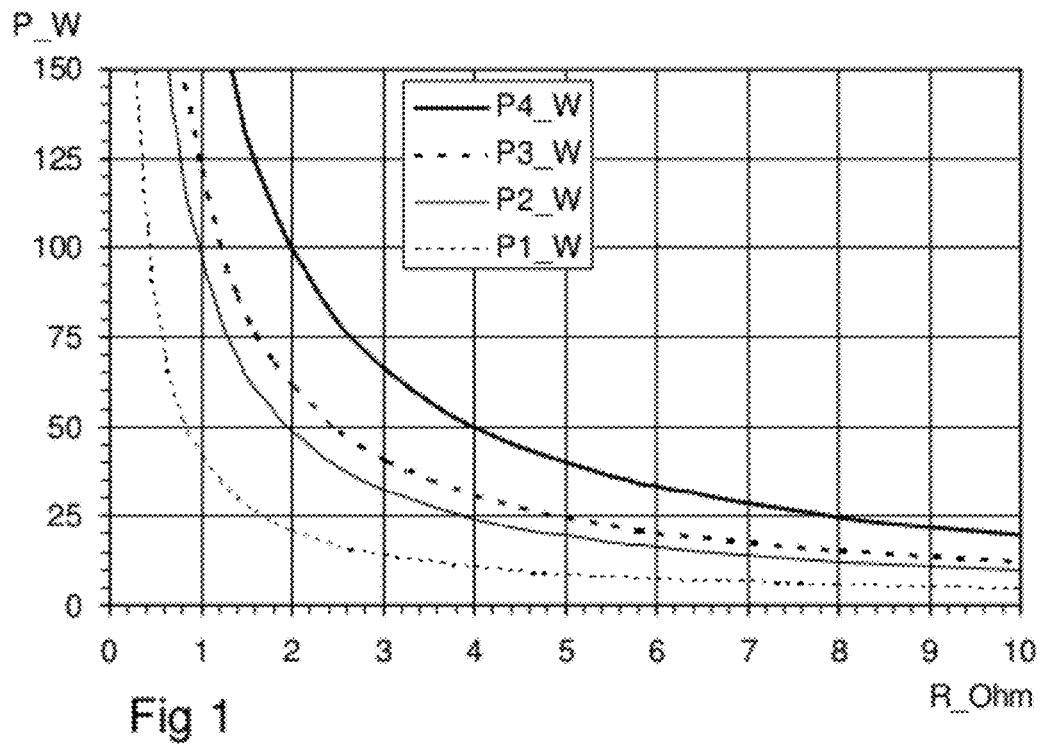
FIG. 1 shows natural $P=U^2/R$ characteristic curves for a voltage source at various source voltages.

Before giving a detailed description of the embodiments in accordance with FIGS. 1 to 12, there follow a few general explanations regarding the embodiments.

In one embodiment of a device for stretching and/or separating a wire electrode for a spark-erosive wire-cutting machine, for automatic threading into a wire guide, for example, a starting hole or a cutting gap in the workpiece, said device comprises a DC voltage source to apply an electrical load current or a heating current [created] by said DC voltage source to the wire electrode in order to heat the wire electrode, heating current and a heat output control device wired in the circuit between the DC voltage source and the wire electrode and which modifies the power characteristic curve for the DC voltage source as a function of the load resistance of the wire electrode through a feedback loop of load current and source voltage such that the heat output acting on the wire electrode is adjusted to predetermined operating conditions for the stretching and/or separating procedure. The existing DC voltage source for an erosion generator of the wire-cutting machine is used as the DC voltage source and switched into the heat output control device during a threading procedure through a switching element for heating the wire electrode.

Embodiments of the invention make it possible to stretch, to straighten and to separate the wire electrode with a pointed tip in a single procedure using a device which has an optimized characteristic curve as a function of the resistance.

In a further embodiment, a method of stretching and/or separating wire electrodes while transferring an electrical current is proposed for automatic threading into guides of spark-erosive wire-cutting machines and in said method the natural characteristic curve $P=U^2/R$ for a DC voltage source as a function of the load resistance of the wire electrode is modified by feedback or reverse feedback loops of load current and source voltage in such a way that experimentally determined optimal operating points for the stretching and separation procedure are located on the modified characteristic curve.

In a further embodiment, a device for stretching and/or separating wire electrodes while transferring an electrical current is proposed for automatic threading into guides for spark-erosive wire-cutting machines and in said device the existing DC voltage source of the erosion generator is connected during the threading process through a switching element to a heat output control device with an optimized characteristic curve, said heat output control device consisting of a pulse width regulator, switching elements, a transformer, a current measuring device and a voltage measuring device.

In a further embodiment, the methods and devices make possible a reliable and rapid automated threading process on spark-erosive wire-cutting machines with closed round guides without the complicated entry of parameters. A heat output control device with an optimized output characteristic curve is fed from a DC voltage source of the erosion generator. Through a feedback loop of heating current and source voltage, the characteristic curve is adjusted such that different wire types or different annealing lengths for the wire provide optimal results for the stretching, straightening and separating of the wire electrode without a controlled intervention. With adaptive control it is possible to thread future types of wire automatically without reprogramming.

The methods and devices described are particularly suitable in embodiments of the invention for the automatic threading process of wire electrodes in closed round guides with normal or little guide play and in open V-guides for wire erosion machines.

Particularly interesting applications in embodiments of the invention are: threading into starter holes which are only slightly larger than the wire electrodes, and, following a wire break, threading directly into the cutting gap without returning to the starter hole. A major field of application is thus the fully automated and autonomous spark-erosive processing of workpieces on wire cutting machines.

Embodiments of the invention have the advantage that wire electrodes of any diameter, material and length can be automatically straightened, separated and threaded quickly and with a high success rate. Only the already existing parameter information for the automatic threading process is necessary, and future wire materials should not require any reprogramming. The heat loss from the heat output control device is so low in the embodiments that it can be placed at any location in the machine without causing noticeable thermal distortion in the machine structure.

Now to return to the detailed description of some embodiments:

The natural hyperbolic performance characteristic curves $P=U^2/R$ for a voltage source such as are used in one embodiment of the invention as a function of a variable load resistance R are shown in FIG. 1. The source voltage acting on the variable load resistance of a wire electrode is $P1\_W=6.46V$, $P2\_W=9.86V$, $P3\_W=11.05V$, $P4\_W=14.11$ for the characteristic curves. It can be seen that the power delivered from an ideal voltage source at low wire electrode resistance tends asymptotically to infinite. A short circuit would probably destroy the source.

Figure 2:
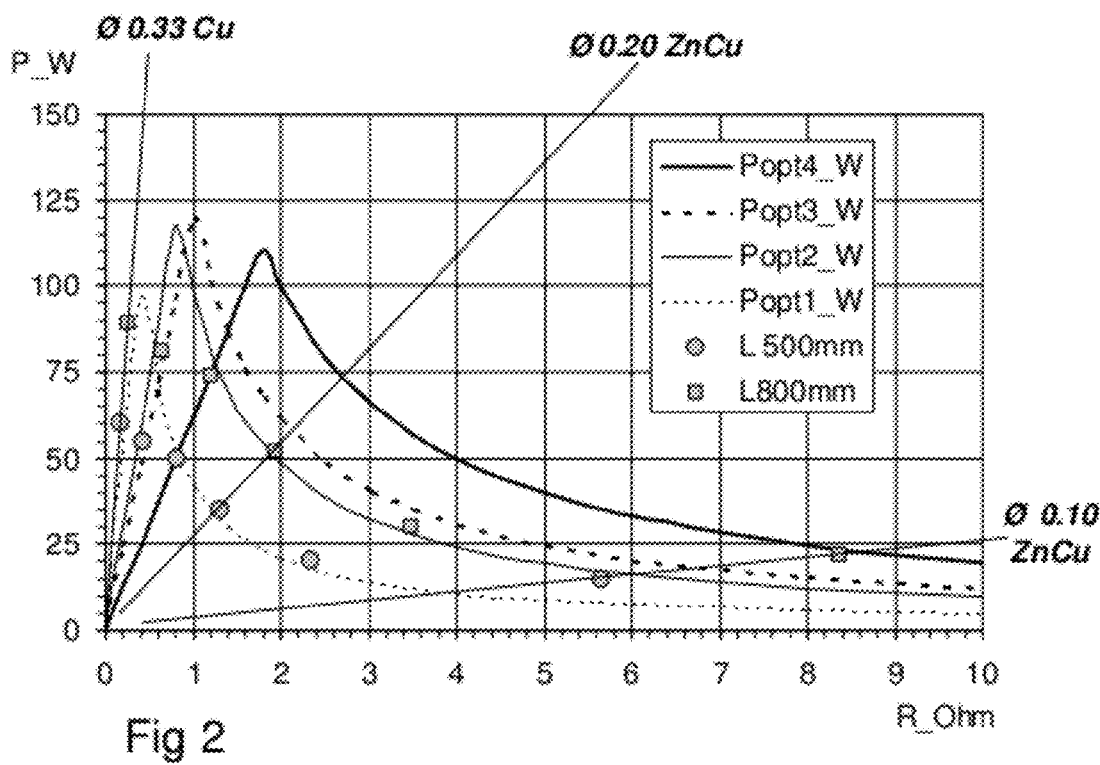
FIG. 2 shows examples of optimized characteristic curves for machines with a constant annealing length in accordance with one embodiment.

FIG. 2 shows an embodiment of power characteristic curves Popt1_W to Popt4_W optimized in accordance with the invention under the same conditions as FIG. 1. This embodiment is particularly suitable for machines which have a constant wire electrode length in the annealing area. In addition, the optimal, experimentally determined operating points for different wire electrodes are drawn in. The circular operating points L500 mm apply to a wire length of 500 mm and the square operating points L800 mm apply to a wire length of 800 mm. The required heat output grows in principle proportionally with wire length.

Thus, three straight lines are drawn in on which all intermediate points for other wire lengths lie: Ø0.33 Cu for a 0.33-mm pure copper wire with a zinc coating with an extremely low resistance, Ø0.20 ZnCu for a 0.2-mm brass wire with medium resistance, and Ø0.10 ZnCu for a 0.1-mm brass wire with a zinc coating with very high resistance. The objective of optimizing the characteristic curves is now to hit all the operating points with the greatest accuracy with low, or the lowest, control complexity.

The following steps are taken in the embodiment: First, the effective load or heating current, and thus the heat output applied to the wire electrode, is limited to a specified maximum value (in Example 2 to 22A), second, this maximum value is reduced once more proportionally to the voltage (in Example 2 by 1 A/V), and third, the source voltage, as far as necessary, is matched to the wire type. The last step is required only with special designs for wire-cutting machines if the wire length in the annealing area changes with different workpiece height, as will be described in what follows using FIG. 11 and FIG. 12.

From FIG. 2 it can be seen that a Ø0.33 Cu wire with the characteristic curve Popt_1 would be well adapted to different wire lengths without intervening in the source voltage. In like manner, the next two wires with slightly higher resistance could be matched ideally using Popt_3 or Popt 4 following the same principle. All the subsequent wires Ø0.20 ZnCu to Ø0.10 ZnCu would, on the other hand, require the source voltage to be adjusted to the wire length.

Since the wire length in the annealing area in this example is assumed to be constant, the optimal operating points for a large number of wire types can be met with a single optimized characteristic curve (i.e. with a constant source voltage). The source voltage would have to be corrected somewhat only for the extreme wires.

Figure 3:
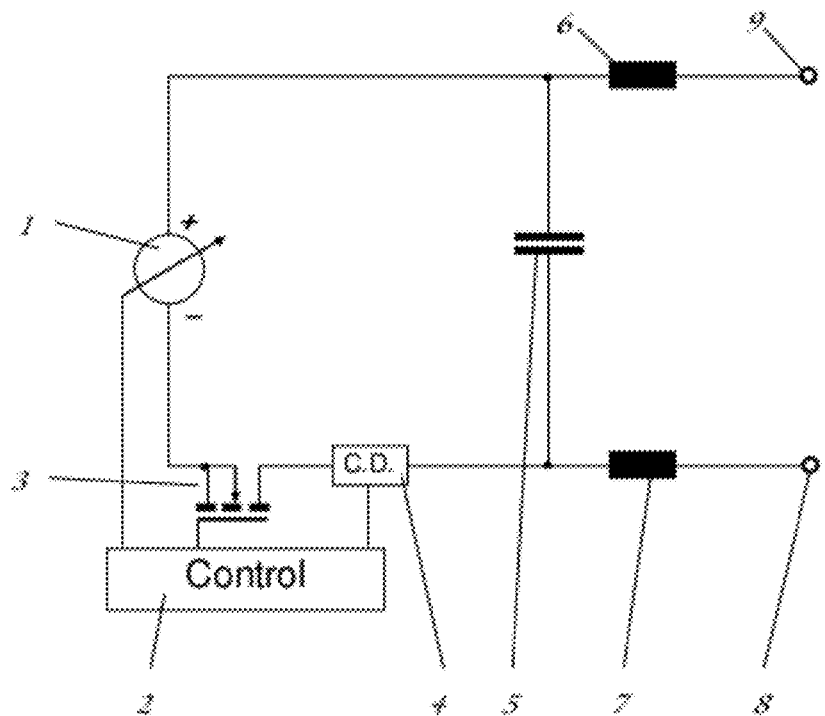
FIG. 3 shows an embodiment of a block diagram for generator adaptation.
Figure 4:
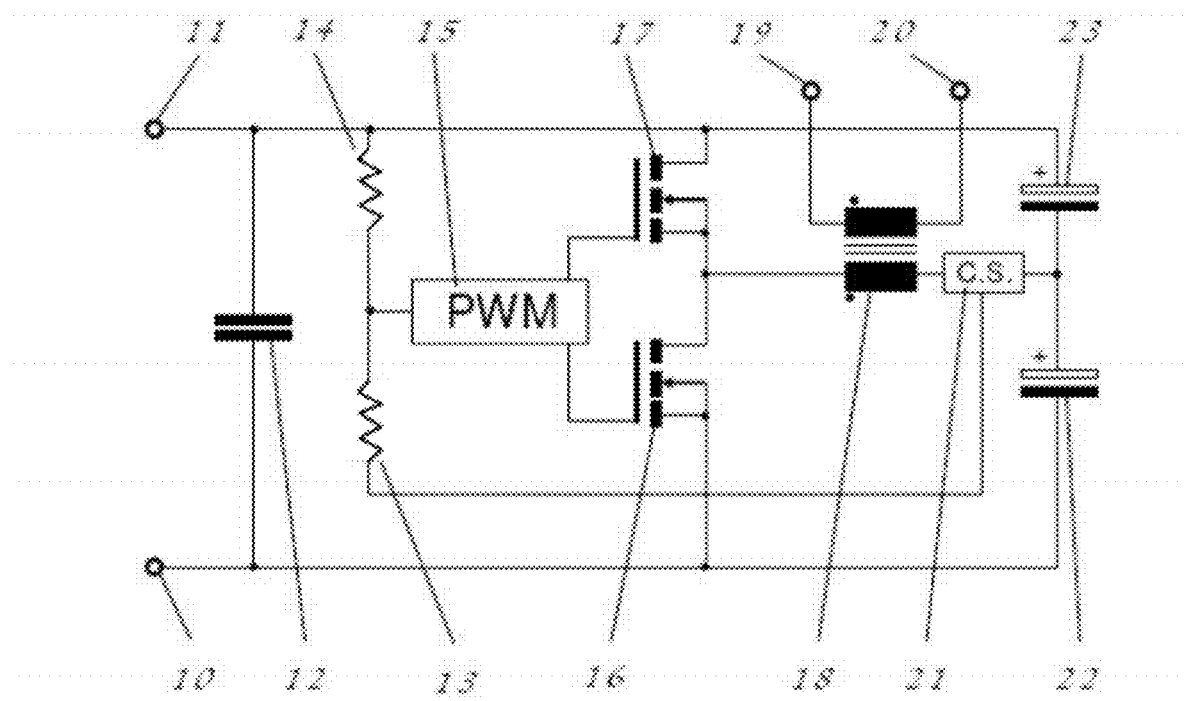
FIG. 4 shows an embodiment of a block diagram for an optimized heat output control device.

The optimization described and the values cited serve to give a better understanding of the circuits in accordance with FIG. 3 and FIG. 4 and they are naturally only one example of infinitely numerous possible solutions, other approaches can lead to similar results.

The block diagram for generator adjustment in accordance with one embodiment is shown in FIG. 3. Wire cutting machines generally have a DC voltage source 1 to supply the impulse generator which naturally does not require any power during the threading process. Such DC voltage sources 1 typically develop about 4 kW of power and their output voltage is normally adjustable by way of the machine controls 2. The DC voltage source is therefore ideally suited to providing the maximum heat output which is about 1000 W maximum. All the required input parameters. such as wire type and workpiece height, are available in the machine controls 2 to optimize the threading process and have only to be processed. For example, the same optimal source voltage will be assigned to all wire types which, as described, do not require any adjustment to the wire length. For the remaining wire types, the source voltage would be adjusted using a mathematical function as a function of a variable wire length.

Consequently, no additional inputs are required to optimize the threading process.

Generator adjustment in accordance with FIG. 3 comprises an additional switching element 3 (which could also be a simple relay) to switch the heating current on and off, a current detector 4 (I>a) to detect a current greater than a minimal value a, for example a=0.1 A, and an suppression filter consisting of a capacitor 5 and two inductors 6, 7 to keep interference from the spark discharges during the erosion process away from the machine controls. The current detector 4 can, for example, consist of a precision resistor and a bipolar transistor where the resistance is selected equal to base emitter voltage/a (0.7V/0.1 A=7Ω). Other known solutions, such as a precision resistor with a compensator or magnetic current detectors are naturally possible as well. The source voltage is transferred through the output terminals 8, 9 and a two-wire line of about 1.5 mm² conductor cross-section to the input terminals 10, 11 of a heat output control device which is shown in greater detail in FIG. 4. A DC voltage transmission of this type can take place over almost any distance with a high degree of efficiency and requires only a small filter capacity to ensure immunity from interference.

The heat output control device is advantageously installed in the machine in close proximity to the wire to be heated in order to be able to transmit a maximum heating current approaching 20 A with as little loss as possible. An alternative arrangement would be to install only one transformer 18 (see FIG. 4) in the machine and to provide the remainder of the heat output control device together with the generator adapter in the generator. It would be possible to resort to this arrangement if the DC voltage source 1 for the impulse generator were not programmable. In the second instance, the voltage would be adjustable through the pulse-width modulation of a pulse width modulator 15 and the voltage feedback could similarly be generated with a proportional control signal.

In the first case, the machine controls 2 for the DC voltage source 1 transmit the setpoint for the voltage and then switch on the heating current through the switching element 3. The machine controls 2 receive information from the current detector 4 whether the wire electrode is carrying the heating current at all and when separation takes place. The duration of the separation process can be determined from this and the optimization for subsequent separation processes can be automatically refined as necessary (adaptive control).

The optimized heat output control device in FIG. 4 also contains a filter capacitor 12 and two buffer capacitors 22, 23. A pulse width regulator 15 controls a half bridge consisting of the switching elements 16, 17. MOSFET components are preferably used for the switching elements 16, 17 because of their parasitic diodes so that the idle power (particularly in the event of a short circuit) can be routed back to the DC voltage source. Other components, such as bipolar transistors or IGBT, could also be used together with anti-parallel diodes. The half-bridge array 16, 17, 22, 23 has the advantage that even with imprecise, asymmetrical pulse widths the transformer 18 is never saturated because the voltages over the buffer capacitors 22, 23 are immediately adjusted to asymmetry. Other embodiments such as full-bridge or individual switch principles are naturally not excluded.

The heat output control device further has a current sensor 21 (I av) which measures the primary current from the transformer 18 and converts it into a DC voltage signal. A small 100:1 current transformer is suitable as a current sensor 21, with rectifier diodes, a 10Ω resistance and a filter capacitor. The DC voltage signal thus received is taken back through a resistance 13 to a current limiting input for the pulse width regulator 15. The voltage from the DC voltage source 1 is scaled via a resistance 14 and taken to the same input, where the pulse width regulator 15, using the sum of the two measured values across the switching elements 16, 17 regulates the effective primary current from the transformer 18 such that a set limit value for this sum is not exceeded. The effect of a feedback loop of the primary current to the pulse width regulator 15 is that the latter, as a reaction, limits the effective primary current in the primary winding of the transformer to a specified value by appropriate pulse width regulation of the control signals of the switching elements 16 and 17. As a result, the effective secondary current (heating current) in the secondary winding of the transformer 18 and thus the average electrical output (heating power) acting on the wire electrode is limited to a specified value. This value can be determined by experiment and is dependent (among other things) on the resistance of the wire electrode and the source voltage.

In other words, the higher the voltage at the current-limiting input of the pulse width regulator 15, the lower the current limitation turns out. In this way, the desired optimization of the characteristic curve is achieved to supply increased current at low load resistance but without allowing excessive currents or outputs. By adjusting current limitation, the values for the two resistances 13, 14 and the level of the source voltage, the characteristic curves can be set in almost any fashion. The expressions current limitation or power limitation refer in each case to the effective values of current/voltage or the average electrical power which is transmitted to the wire electrode.

The wire electrode is connected to the AC outputs 19, 20 by short wires of about 2.5 mm² conductor cross-section.

FIGS. 5 to 8 show oscillograms for an optimized heat output control device in accordance with one embodiment at a fixed operating frequency of about 14.5 kHz. Various operating conditions are simulated using an artificial load. Operating frequency can also be optimized, the higher it is selected, the smaller the transformer 18, and the lower it is selected the lower the commutation losses of the switching elements 16, 17 turn out. The transformer 18 consists in this example of a highly permeable R36 ferrite ring core with 34 primary windings of copper wire, 0.85 mm in diameter, and 12 secondary windings of stranded wire, 2.5 mm² copper cross-section. The channel (Ch 1) shows the control signal for the switching element 17, Channel 2 (Ch 2) the plot of the bridge branch voltage between the switching elements 16, 17, Channel 3 (Ch 3) the plot of the output voltage across the AC outputs 19, 20 and Channel 4 (Ch 4) the plot of the output current on the AC output 19. The voltage of the DC voltage source 1 is in all cases 67V. The adjusted maximum current for the heat output control device is 16 A_aver and is reduced by 0.13 A/V at 67V source voltage to about 7 A_aver.

Figure 5:
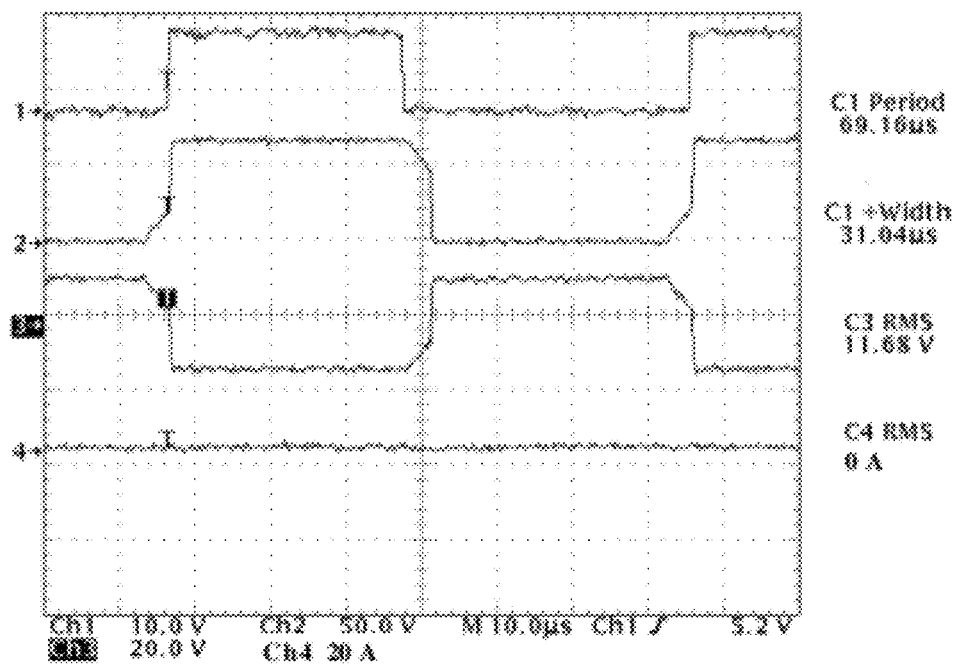
FIG. 5 shows voltage and current plots at no-load operation.

FIG. 5 shows the case at no-load operation, when, for example, the wire electrode is not making contact or is already severed. The current in the current detector 4 is 30 mA in the case of no-load operation and the detector 4 would not respond. The AC output voltage is 11.68V_rms and the total power loss is 2 W. The duty cycle is strictly limited to 90% in order to prevent cross currents in the switching elements 16, 17.

Figure 6:
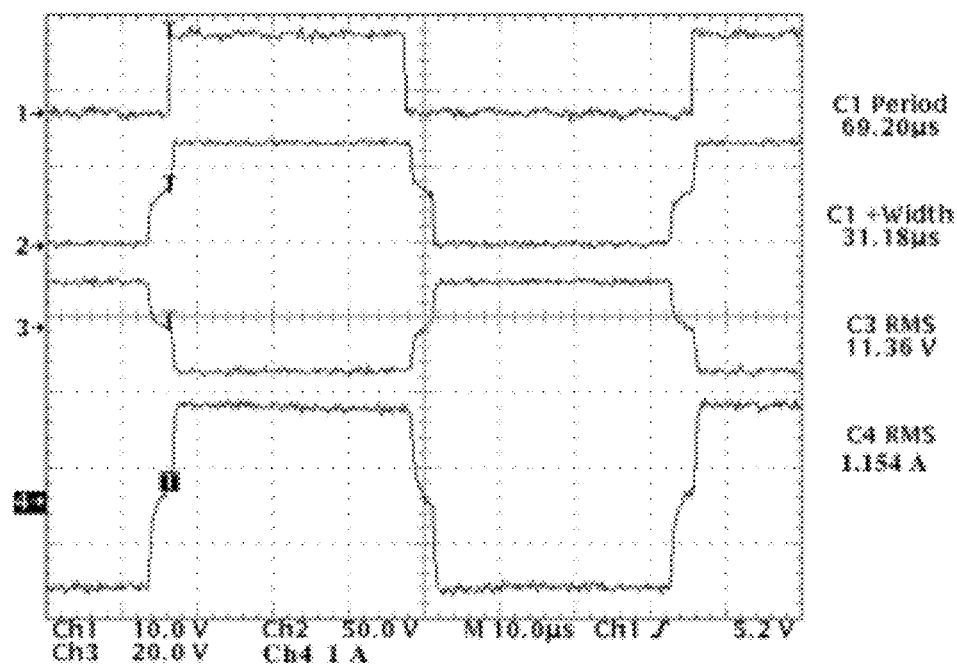
FIG. 6 shows voltage and current plots at a load of 9.4Ω.

FIG. 6 shows the case of a very thin and long wire electrode with a resistance of 9.8Ω. The current in the current detector 4 is now 220 mA_aver and it would respond. The AC output voltage is 11.36V_rms, the output current 1.154 A_rms and the total power loss is only just 1.64 W, which corresponds to an efficiency of 89%. The duty cycle remains at 90% since the operating point still remains in the natural $U^2/R$ range of the characteristic curve.

Figure 7:
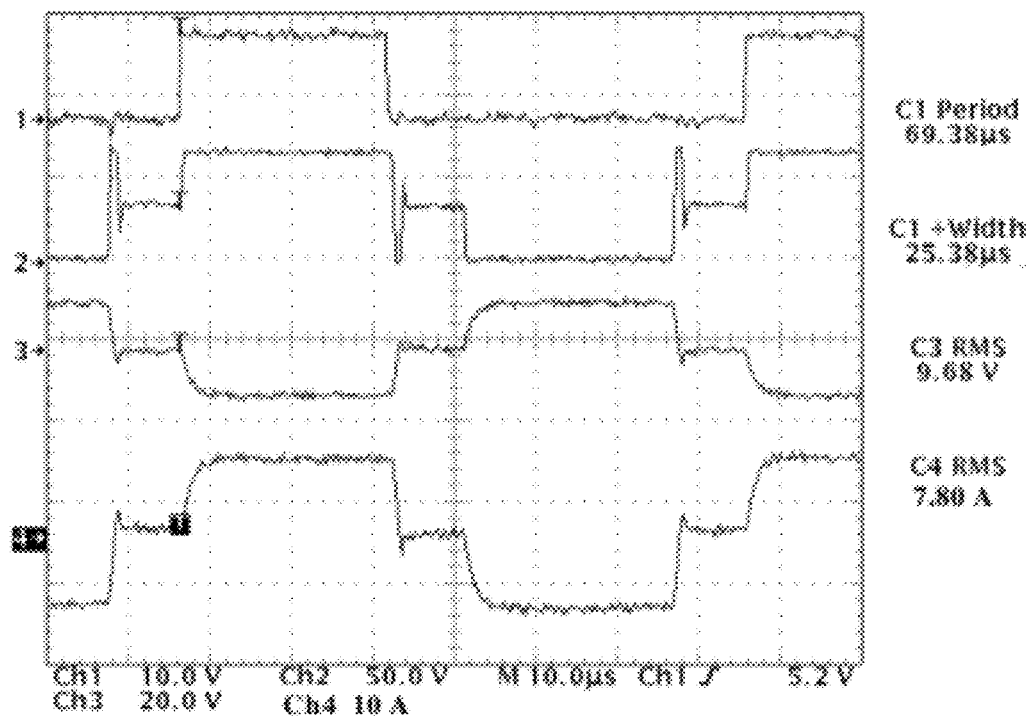
FIG. 7 shows voltage and current plots at a load of 1.2Ω.

FIG. 7 shows the case of a typical wire electrode of 0.25 mm diameter, 800 mm in length and a resistance of 1.2Ω. The current in the current detector 4 is 1.22 A_aver and said detector would similarly respond. The AC output voltage is 9.68_rms, the output current 7.80 A_rms, and the total power loss is 6.24 W, which corresponds to good efficiency of 92.4%. The duty cycle is reduced to about 73% since the operating point is now in the range of the current limitation of the characteristic curve.

Figure 8:
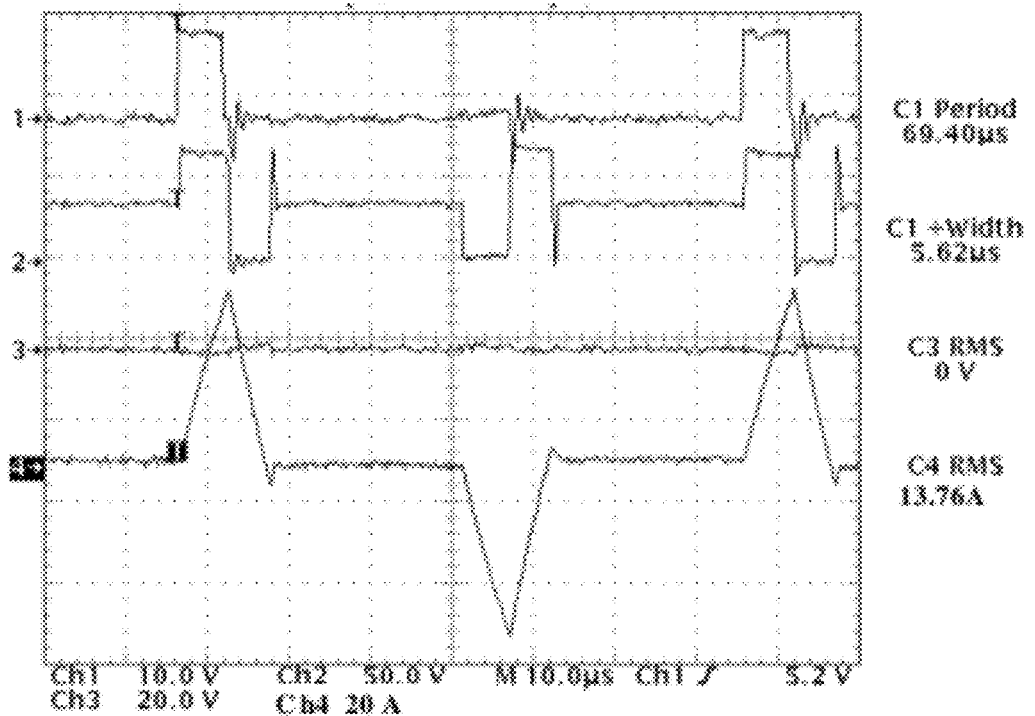
FIG. 8 shows voltage and current plots with a short circuit.

FIG. 8 shows the unusual incident of a short circuit. The current in the current detector 4 is 310 mA_aver and it would respond similarly. The AC output voltage is correspondingly 0V_rms, the output current 13.76 A_rms and the power loss is now about 20 W which can be attributed to the high peak current of about 43 A_peak on the secondary side and about 15 A_peak on the switching elements 16, 17. The duty cycle is drastically reduced to 16% because the maximum current, which is additionally reduced by the feedback of the source voltage 1, was exceeded and resets at the effective value mentioned of 13.76 A_rms, which with this type of current corresponds approximately to the expected average of 7 A_aver.

A disruption of this kind would, however, be detected by the machine controls 2, switched off and reported since a stored maximum time was exceeded. A maximum temperature safety cutoff can advantageously be provided in addition in order not to have to dimension the heat output control device for a power loss of 20 W (unlikely in any case).

Figure 9:
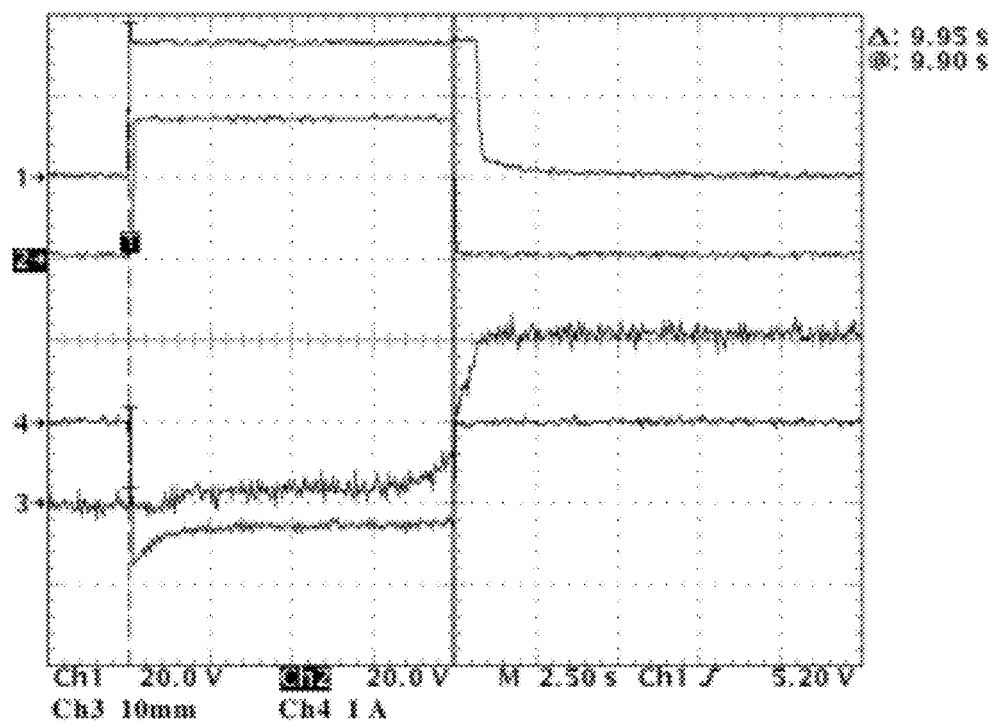
FIG. 9 shows a voltage, current and expansion graph with insufficient heat output.

FIG. 9 shows the actual separation process of an 800-mm long wire electrode of 0.3-mm high-strength brass at too low heat output. Channel 1 (Ch1) is the voltage of the DC voltage source 1, in this case 34V. Channel 2 (Ch2) is the output of the current detector 4, Channel 3 (Ch3) is a motion sensor which detects the elongation of the wire electrode, and Channel 4 (Ch4) reproduces the current from the DC voltage source 1 (with negative amplitude). It can be seen immediately that the power produced of about 50 W is much too low for this type of wire, the optimal value for 800 mm would be 81 W. Consequently, the separation time of 9.95 secs would be extremely long and machine controls 2 with adaptive control would likewise have terminated the separation process but, instead of the error message, would have automatically increased the heat output by a calculated amount and independently have started a new attempt.

A simple strategy for adaptive control could be, for example, to multiply the time difference (duration of separation minus optimal time) by a constant (experimental empirical value and partially dependent on wire type) and to add or subtract this value to/from the setpoint value for the DC voltage source 1 depending on its sign. This strategy has the advantage that it tends to converge to the optimal value since smaller and smaller time discrepancies cause corrections that become correspondingly smaller.

Furthermore, it can be seen from FIG. 9 that with too low a heat output the wire electrode is not, or only insubstantially, stretched, here only thanks to the lower cold resistance of the wire electrode after about 1 sec by a negligible 2 mm, then to remain absolutely unchanged until the start of separation at about 7.5 secs. A wire electrode separated in this way has a poor prognosis for successful threading.

Figure 10:
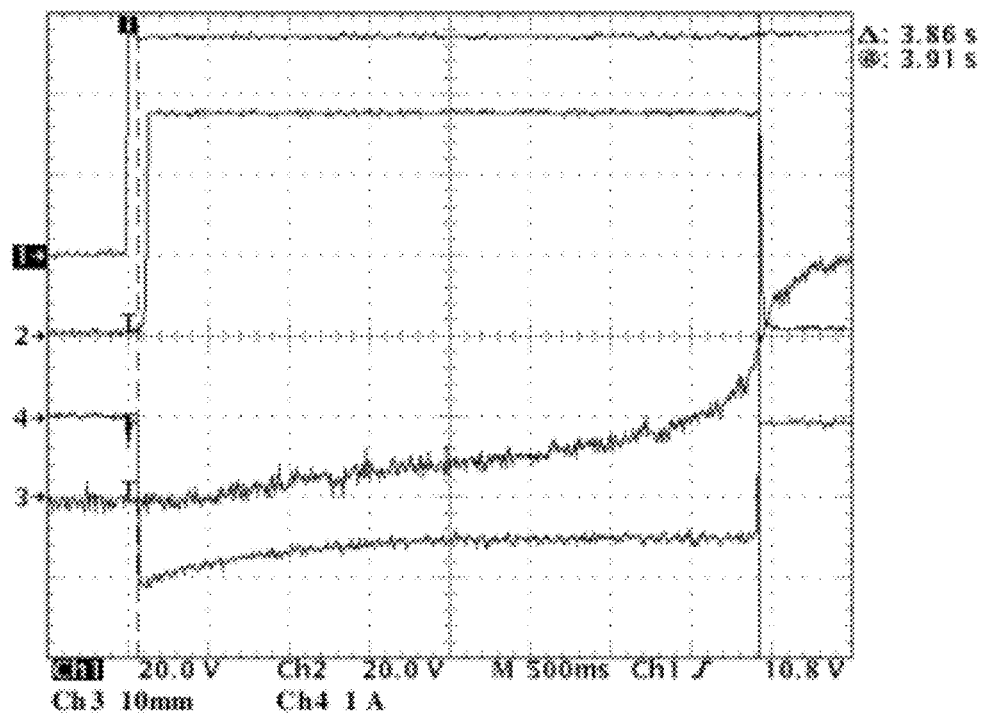
FIG. 10 shows a voltage, current and expansion graph with optimal heat output.

FIG. 10 is a trace of an actual separation process of an 800-mm long, 0.33 mm-thick brass wire electrode with a high copper content, but now at the optimal heat output. The procedure lasts 5.86 secs and over the first 3 secs the wire electrode lengthens evenly by 10 mm. A wire electrode cut in this manner can be threaded with a high degree of probability even into closed round guides with little play.

FIG. 11 again shows four optimized characteristic curves as in FIG. 2. These characteristic curves are optimized for use in a normal universal machine with a variable annealing range of typically 500 mm to 800 mm.

The advantage of this optimization is in the excellent agreement of the wire characteristic curves with the linearly rising part of the heat output control device characteristic curves in the area where current limitation is active. As a result of this agreement, no adjustment of the source voltage to the length of the wire electrode is necessary. However, unlike the characteristic curves in FIG. 2, an individual source voltage is needed for each wire type. The four characteristic curves shown, Popt5_W to Popt8_W, allow wire electrodes in the range from 0.1 mm to 0.25 mm diameter and with a length in the range from about 10 mm to 800 mm to be stretched and separated without difficulty.

The source voltages for the DC current source 1 are for: Popt_5W=56V, Popt_6W=66V, Popt_7W=73.5V, and Popt_8W=78V. On the wire electrode (after the transformer 18) this corresponds to: for Popt_5W=9.52V, Popt_6W=11.22V, Popt_7W=12.5V and Popt_8W=13.6V.

Referenced to the wire electrode, current limitation with this optimization is set at 25 A and is reduced across the voltage with 1.765 A/V. The result is the following voltage-dependent current limitations: Popt_5W=8.2 A, Popt_6W=5.2 A, Popt_7W=2.95 A and Popt_8W=1.6 A.

Figure 12:
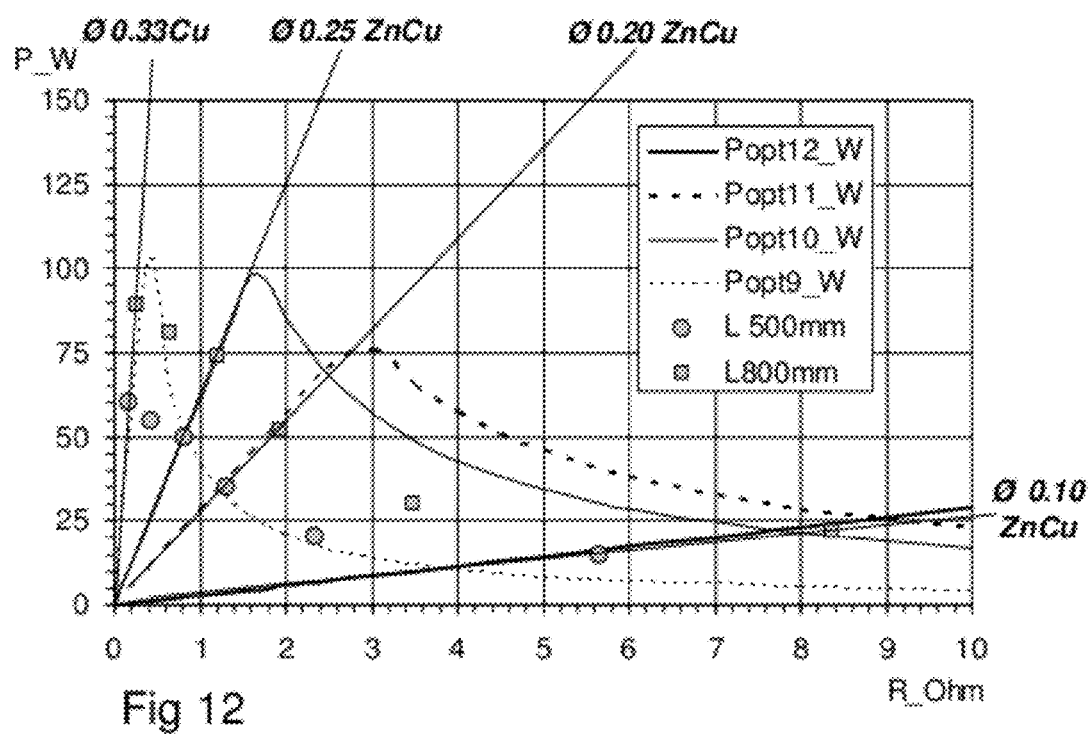
FIG. 12 shows a second example of optimized characteristic curves for machines with variable annealing length with an expanded wire and length range.

Four additional optimized characteristic curves are shown in FIG. 12. These characteristic curves are optimized for use in a large machine which similarly has an annealing area of variable length.

The four characteristic curves shown, Popt_9 to Popt_12, allow wire electrodes in an expanded range of diameters from 0.1 mm to 0.33 mm and with an annealing length in the range from about 10 mm to more than 1000 mm to be similarly stretched and separated without difficulty.

The source voltages for the DC voltage source 1 are now for Popt_9W=38V, Popt_10=77V, Popt_11W=89V and Popt_12W=106V. On the wire electrode this corresponds to: Popt_9W=6.46V, Popt_10W=13.1V, Popt_11W=15.1V and Popt_12W=18.1V.

Referenced to the wire electrode, current limitation with this optimization is set a 24 A and is reduced over the voltage with 1.235 A/V. The result for the different wire electrodes is the following voltage-dependent current limitations: Popt_9W=16.02 A (Ø0.33Cu), Popt_10W=7.83 A (Ø0.25ZnCu), Popt_11W=5.31 A (Ø0.20ZnCu), and Popt_12W=1.7 A (Ø0.10ZnCu).

Figure 11:
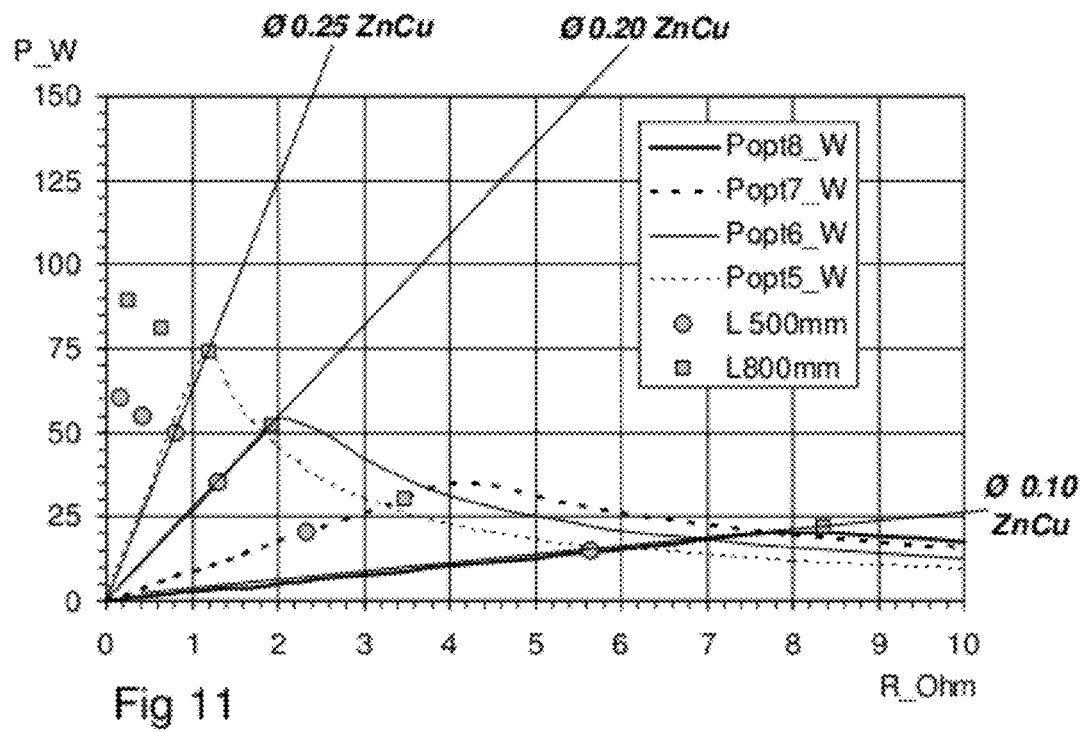
FIG. 11 shows an example of optimized characteristic curves for machines with variable annealing length with a limited wire and length range.

The examples in accordance with FIGS. 2, 11 and 12 show how, with minor changes to source voltage, current limitation and voltage-dependent manipulation of current limitation, the characteristic curves can be adapted to different requirements.

Advantageously, only source voltage is provided as a variable parameter, the remaining parameters are preferably specified through fixed values (such as, for example, the maximum duty cycle, current limitation and resistances 13, 14). This is not intended to be understood in a restrictive manner, and other methods and solutions which meet the spirit and purpose of the present invention should be protected as defined subsequently in the claims.

What is claimed is:

1. A method for at least one of stretching and separating a wire electrode of a spark-erosive wire-cutting machine comprising:
applying to the wire electrode an electrical load current from a DC current source or a heating current created by said load current in order to heat said wire electrode, wherein a power characteristic curve of the DC current source is modified as a function of a load resistance of the wire electrode by an at least partial feedback loop of said load current and a source current such that a heat output acting on the wire electrode is adjusted to a predetermined operating condition for the at least one of the stretching and separating of the wire electrode, wherein the power characteristic curve is determined according to $P=U^2/R$, wherein P is power in watts, U is voltage in volts, and R is electrical resistance of the wire electrode in ohms.

2. The method of claim 1, wherein the power characteristic curve for the DC current source is modified such that a plurality of predetermined optimal operating points for the at least one of the stretching and separating of the wire electrode are included on the power characteristic curve.

3. The method of claim 1, wherein the power characteristic curve has a high current limitation at a low source voltage and a lower current limitation at a high source voltage.

4. The method of claim 1, wherein the load current is measured with a current sensor and a measured load current value is increased by a factor proportional to the source current and the measured load current value is compared with a set limit value and, if the limit value is exceeded, an output power of the current source is reduced just enough so that the set limit value is not exceeded.

5. The method of claim 4, wherein the measured load current value from the current sensor is taken through a first resistance, which scales the current, to a current limiting input of a pulse width regulator and through a second resistance, which scales the voltage, the source current being similarly taken to the current limiting input and the pulse width regulator using a sum of the load current and the source current to regulate the load current through one or more switching elements such that the limit value set for the sum is not exceeded.

6. The method of claim 1, wherein the source current is provided from an existing DC voltage source of an erosion generator through a first switching element and a current detector, and a transformer is provided between a second switching element and the wire electrode to adjust voltage at the DC current source.

7. The method of claim 6, wherein an AC voltage is taken directly to the wire electrode from a secondary winding of the transformer and the current detector measures the current of a primary winding of the transformer.

8. The method of claim 6, wherein the first switching element and the current detector are located adjacent the DC voltage source a controller and at least the transformer is located adjacent the wire electrode and the controller sends a set value to the DC voltage source in order to adjust the source current such that the power characteristic curve is adjusted to the wire electrode which is to be separated, and the controller receives a signal from the current detector which confirms passage of current through the wire electrode.

9. The method of claim 6, wherein in the event the DC voltage source has not provided a voltage adjustment, all elements with the exception of the transformer are located in the proximity of the DC voltage source and a controller, and the voltage adjustment is sent to a pulse width input of the pulse width regulator and via the second resistance to the current limiting input of the pulse width regulator.

10. The method of claim 1, wherein when a current passage through the wire electrode is lacking at a start of the separation of the wire electrode, wherein a controller terminates the separation of the wire electrode and issues a first error message and otherwise measures a time until the current passage is interrupted by the separation and if a preprogrammed maximum time is exceeded the separation is similarly switched off and a second error message is issued.

11. The method of claim 10, wherein the controller compares a time measured for the separation with a stored, optimal time and calculates a new optimal source voltage from a difference which is sent to the DC voltage source for the succeeding separation procedures.

12. The method of claim 10, further comprising recognizing a novel wire electrode because of a difference between a time measured for the separation and an optimal time and recalculating the source current is recalculated with the aid of a mathematical correction formula and used for a subsequent separation.

13. The method of claim 1, wherein the power characteristic curve for machines with a variable wire length in an annealing area thereof is set such that an optimal source voltage is allocated to all the wire electrodes used and with a change in wire length the respective wire electrode is optimally stretched, straightened and separated with a pointed tip without any intervention in the parameters.

14. The method of claim 1, wherein the power characteristic curve for machines with a constant wire length in an annealing area thereof is set such that all the wire electrodes used are optimally stretched, straightened and separated with a pointed tip without changing the parameters.

15. A device for at least one of stretching and separating a wire electrode of a spark-erosive wire cutting machine comprising:
   a DC voltage source to apply at least one of an electrical load current and a heating current created by said load current to the wire electrode to heat the wire electrode, wherein
   a heat output control device is in series between the DC voltage source and the wire electrode, the heat output control device operable to modify a power characteristic curve of the DC voltage source as a function of a load resistance of the wire electrode through an at least partial feedback loop of the load current and a source voltage such that a heat output acting on the wire electrode is adjusted to a plurality of specified operating conditions for the at least one of the stretching and separating of the wire electrode.

16. The device of claim 15, wherein an existing DC voltage source of an erosion generator of the wire cutting machine is used as the DC voltage source and is connected to the heat output control device during a threading process by way of a switching element to heat the wire electrode.

17. The device of claim 15, wherein a current detector is located between the DC voltage source and the heat output control device which reports the presence of a heating current in the wire electrode to a controller input and the controller has a first output for the DC voltage source in order to transmit a set value for the voltage and the controller has a second output to switch the switching element on and off.

18. The device of claim 15, wherein filter media are at least one of located in a heat output control device and located between the heat output control device and a controller to suppress interference from spark discharges.

19. The device of claim 15, wherein the heat output control device is located in immediate proximity to the wire electrode.

20. The device of claim 15, wherein machine controls have controlling, regulating or adaptive control loops for monitoring, regulating and/or adaptive controls and diagnostics for the separating of the wire electrode.

21. The device of claim 15, wherein the heat output control device has a pulse width modulator for controlling the load current and a current measuring device for measuring the load current, where the load current is fed back to the input of the pulse width regulator in order to adjust the power characteristic curve to a plurality of specified operating conditions.

22. The device of claim 21, wherein a measured value of the current sensor is taken through a first resistance, which scales the current, to a current limiting input of the pulse width regulator and through a second resistance, which scales the voltage, the source voltage being similarly taken to the current limiting input, and the pulse width regulator using a sum of the load current and the source voltage to regulate the load current through one or more switching elements such that a set limit value for the sum is not exceeded.

23. The device of claim 22, wherein only the transformer is located in immediate proximity to the wire electrode.

24. The device of claim 22, wherein on machines with constant annealing length for the wire electrode, the heat output control device is provided with a first set of values for current limitation, the first resistance and the second resistance.

25. The device of claim 22, wherein on machines with variable annealing length for the wire electrode, the heat output control device is provided with a second set of values for current limitation, the first resistance and the second resistance.

26. The device of claim 15, wherein a voltage measuring device is provided to measure an input voltage created by the DC voltage source at a pulse width regulator and of one or more switching elements which are activated by the pulse width regulator to adjust the load current.

27. The device of claim 26, wherein a plurality of switching elements form a half bridge and a primary winding of a transformer is connected on a part to the half bridge and on another part through a current sensor to two buffer capacitors wired in series and a secondary winding of the transformer is attached directly to the wire electrode.

28. The device of claim 26, wherein the pulse width regulator has an input to establish a maximum duty cycle and an input to establish a current limitation and an input to establish a switching frequency and two outputs for an alternative control of the switching elements.

29. The device of claim 15, wherein the source voltage from an existing DC voltage source of an erosion generator is provided through a first switching element and a current detector and a transformer is provided between at least one second switching element and the wire electrode to adjust voltage to the DC voltage source.

30. The device of claim 29, wherein an AC voltage from a secondary winding of the transformer is taken directly to the wire electrode and the current sensor measures the current from a primary winding of the transformer.

31. A spark-erosive wire-cutting machine comprising:
   a device for at least one of stretching and separating a wire electrode of a spark-erosive wire cutting machine, the device including:
      a DC voltage source to apply at least one of an electrical load current and a heating current created by said load current to the wire electrode to heat the wire electrode, wherein a heat output control device is in series between the DC voltage source and the wire electrode, the heat output control device operable to modify a power characteristic curve of the DC voltage source as a function of a load resistance of the wire electrode through an at least partial feedback loop of the load current and a source voltage such that a heat output acting on the wire electrode is adjusted to a plurality of specified operating conditions for the at least one of the stretching and separating of the wire electrode.

* * * * *

UNITED STATES PATENT AND TRADEMARK OFFICE
CERTIFICATE OF CORRECTION

| | | |
|---|---|---|
| PATENT NO. | : 8,129,650 B2 | Page 1 of 1 |
| APPLICATION NO. | : 12/012969 | |
| DATED | : March 6, 2012 | |
| INVENTOR(S) | : Ernst Bühler and Dante Scricciolo | |

It is certified that error appears in the above-identified patent and that said Letters Patent is hereby corrected as shown below:

Column 2, line 56, "drawing" should be --drawings--.

Column 2, line 58, "DRAWING" should be --DRAWINGS--.

Column 5, line 19, "Popt 4" should be --Popt_4--.

Column 5, line 43, "parameters." should be --parameters,--.

Column 5, line 57, "an suppression" should be --a suppression--.

Column 6, line 31, "half bridge" should be --half-bridge--.

Column 7, line 44, "9.8O" should be --9.8Ω--.

Column 7, line 52, "1.2O" should be --1.2Ω--.

Column 9, line 26, "a" should be --at--.

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,129,650 B2  Page 1 of 1
APPLICATION NO. : 12/012969
DATED : March 20, 2012
INVENTOR(S) : Bühler et al.

It is certified that error appears in the above-identified patent and that said Letters Patent is hereby corrected as shown below:

On the Title Page,

Item (73), Assignee, should read -- The Regents of the University of California, Oakland, CA (US) --

Signed and Sealed this
Fifteenth Day of October, 2013

Teresa Stanek Rea
*Deputy Director of the United States Patent and Trademark Office*

UNITED STATES PATENT AND TRADEMARK OFFICE
CERTIFICATE OF CORRECTION

PATENT NO.         : 8,129,650 B2
APPLICATION NO.    : 12/012969
DATED              : March 6, 2012
INVENTOR(S)        : Ernst Bühler et al.

It is certified that error appears in the above-identified patent and that said Letters Patent is hereby corrected as shown below:

This certificate supersedes the Certificate of Correction issued October 15, 2013. The certificate is vacated since no Certificate of Correction was granted for this patent number. The errors appearing on the Certificate of Correction does not correspond to text in the printed patent. The patent number was erroneously mentioned and Certificate of Correction should not have been issued.

Signed and Sealed this
Nineteenth Day of November, 2013

Teresa Stanek Rea
*Deputy Director of the United States Patent and Trademark Office*